United States Patent
Haye

(10) Patent No.: US 10,958,542 B2
(45) Date of Patent: Mar. 23, 2021

(54) SYSTEM FOR ACTIVE DATA ACQUISITION MANAGEMENT IN A GAS TURBINE ENGINE

(71) Applicant: United Technologies Corporation, Farmington, CT (US)

(72) Inventor: Sheridon Everette Haye, Mansfield, CT (US)

(73) Assignee: United Technologies Corporation, Waltham, MA (US)

(*) Notice: Subject to any disclaimer, the term of this patent is extended or adjusted under 35 U.S.C. 154(b) by 303 days.

(21) Appl. No.: 16/174,396

(22) Filed: Oct. 30, 2018

(65) Prior Publication Data

US 2020/0136936 A1 Apr. 30, 2020

(51) Int. Cl.
*H04L 12/26* (2006.01)
*F02C 9/00* (2006.01)
*H04L 29/08* (2006.01)

(52) U.S. Cl.
CPC .............. *H04L 43/024* (2013.01); *F02C 9/00* (2013.01); *H04L 43/16* (2013.01); *H04L 67/12* (2013.01); *F05D 2270/334* (2013.01)

(58) Field of Classification Search
None
See application file for complete search history.

(56) References Cited

U.S. PATENT DOCUMENTS

| | | |
|---|---|---|
| 8,220,329 B2 | 7/2012 | Lee |
| 9,816,897 B2 | 11/2017 | Ziarno |
| 9,846,054 B2 | 12/2017 | Waters et al. |
| 2015/0363981 A1* | 12/2015 | Ziarno ............... G07C 5/0841 701/101 |
| 2016/0178464 A1 | 6/2016 | Burns et al. |

OTHER PUBLICATIONS

Yedavalli et al. ("Application of Wireless Sensor Networks to Aircraft Control and Health Management Systems", J. Control Theory Appl. 2011 9(1), p. 28-33) (Year: 2011).*
Volponi (Gas Turbine Engine Heath Management: Past, Present, and Future Trends Journal of Engineering for Gas Turbine and Power, vol. 136, p. 051201-1-051201-20) (Year: 2014).*
European Search Report for Application No. 19205840.2 dated Jul. 1, 2020.

* cited by examiner

*Primary Examiner* — Roy Y Yi
(74) *Attorney, Agent, or Firm* — Carlson, Gaskey & Olds, P.C.

(57) ABSTRACT

An aircraft sensor system includes a first sensor configured to detect a parameter of an aircraft system and a first micro electro-mechanical-system (MEMS) disposed local to a first component within the aircraft system. The first MEMS is communicatively connected to a controller, and is configured to trigger in response to a corresponding parameter exceeding a threshold. The controller is connected to an output of the first sensor and includes a non-transitory memory storing instructions configured to cause the controller to increase a sampling rate of the first sensor to a sampling rate corresponding to the first component for at least a predetermined length of time in response to the first MEMS being triggered.

15 Claims, 3 Drawing Sheets

SYSTEM FOR ACTIVE DATA ACQUISITION MANAGEMENT IN A GAS TURBINE ENGINE

TECHNICAL FIELD

The present disclosure relates generally to aircraft sensor data acquisition, and more specifically to a system and method for actively controlling a data acquisition rate of an aircraft system sensor.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some examples, a fan is also connected to the shaft and is driven to rotate via rotation of the turbine as well.

During operation of the gas turbine engine, it can be desirable for an engine controller such as a full authority digital engine controller (FADEC) to monitor one or more parameters of the engine operation. The parameters can be monitored using sensors configured to detect the parameters. The data from the sensors is read at an acquisition rate (alternately referred to as a sampling rate). In some instances, such as when certain vibrational events occur, it can be desirable to read data from the sensor more frequently than the base data acquisition rate.

SUMMARY OF THE INVENTION

In one exemplary embodiment an aircraft sensor system includes a first sensor configured to detect a parameter of an aircraft system, a first micro electro-mechanical-system (MEMS) disposed local to a first component within the aircraft system, the first MEMS being communicatively connected to a controller, and being configured to trigger in response to a corresponding parameter exceeding a threshold, and the controller being connected to an output of the first sensor and including a non-transitory memory storing instructions configured to cause the controller to increase a sampling rate of the first sensor to a sampling rate corresponding to the first component for at least a predetermined length of time in response to the first MEMS being triggered.

In another example of the above described aircraft sensor system the first sensor is a vibration sensor.

In another example of any of the above described aircraft sensor systems the first sensor is disposed on a gas turbine engine housing and is configured to sense a parameter of a gas turbine engine.

Another example of any of the above described aircraft sensor systems further includes a plurality of MEMS including the first MEMS, with each MEMS in the plurality of MEMS being local to a distinct component from each other MEMS in the plurality of MEMS.

In another example of any of the above described aircraft sensor systems each MEMS in the plurality of MEMS is connected to the controller and is configured to trigger in response to a corresponding parameter of the component to which the MEMS is local to exceeding a threshold.

In another example of any of the above described aircraft sensor systems the controller is configured to increase the sampling rate of the first sensor to a sampling rate corresponding to each MEMS in the plurality of MEMS for at least a predetermined length of time in response to the corresponding MEMS being triggered.

In another example of any of the above described aircraft sensor systems the sampling rate corresponding to each MEMS is distinct from each the sampling rate corresponding to each other MEMS in the plurality of MEMS.

In another example of any of the above described aircraft sensor systems the sampling rate corresponding to at least two MEMS in the plurality of MEMS is identical.

In another example of any of the above described aircraft sensor systems each MEMS in the plurality of MEMS has a length in its longest dimension ranging from 20 micrometers to 1 millimeter.

In another example of any of the above described aircraft sensor systems the predefined length of time has a length in the range of 100-400 ms.

An exemplary method for operating an aircraft sensor system includes a controller receiving a first signal from a first micro electro-mechanical-system (MEMS) disposed local to a first component, wherein the first signal indicates that a first event has occurred, and the controller increasing a sampling rate of a system sensor from a first sampling rate to a second sampling rate for at least predefined time period in response to receiving the signal.

In another example of the above described exemplary method for operating an aircraft sensor system the second sampling rate is at least sufficient to compensate for a structural vibratory mode of the first component.

In another example of any of the above described exemplary methods for operating an aircraft sensor system the controller receives a second signal from a second micro electro-mechanical-system (MEMS) disposed local to a second component simultaneous with the first signal, wherein the second signal indicates that a second event has occurred, and the controller increasing the sampling rate of the system sensor from the first sampling rate to a higher of the second sampling rate and a third sampling rate, each of the second sampling rate and the third sampling rate corresponding to one of the first and second component.

In another example of any of the above described exemplary methods for operating an aircraft sensor system the predefined time period begins upon receipt of the first signal.

In another example of any of the above described exemplary methods for operating an aircraft sensor system the predefined time period begins when the first signal ceases being received.

In another example of any of the above described exemplary methods for operating an aircraft sensor system the first event is a vibration at the first component exceeding a predetermined threshold.

In one exemplary embodiment an aircraft includes at least one overall system sensor communicatively coupled to a controller, a plurality of micro electro-mechanical-systems (MEMS) disposed throughout the aircraft, each of the MEMS being local to a corresponding aircraft component, and being communicatively coupled to the controller, and the controller being configured to define a sampling rate of the at least one overall system sensor.

In another example of the above described aircraft the controller is further configured to increase the sampling rate of the overall system sensor to an increased sampling rate in response to receiving a signal from one of the MEMS in the plurality of MEMS, wherein the increased sampling rate corresponds to a parameter of the component to which the one of the MEMS is local.

In another example of any of the above described aircrafts the at least one overall system sensor includes a vibration sensor.

In another example of any of the above described aircrafts the controller is a full authority digital aircraft controller (FADEC).

These and other features of the present invention can be best understood from the following specification and drawings, the following of which is a brief description.

DETAILED DESCRIPTION

Figure 1:
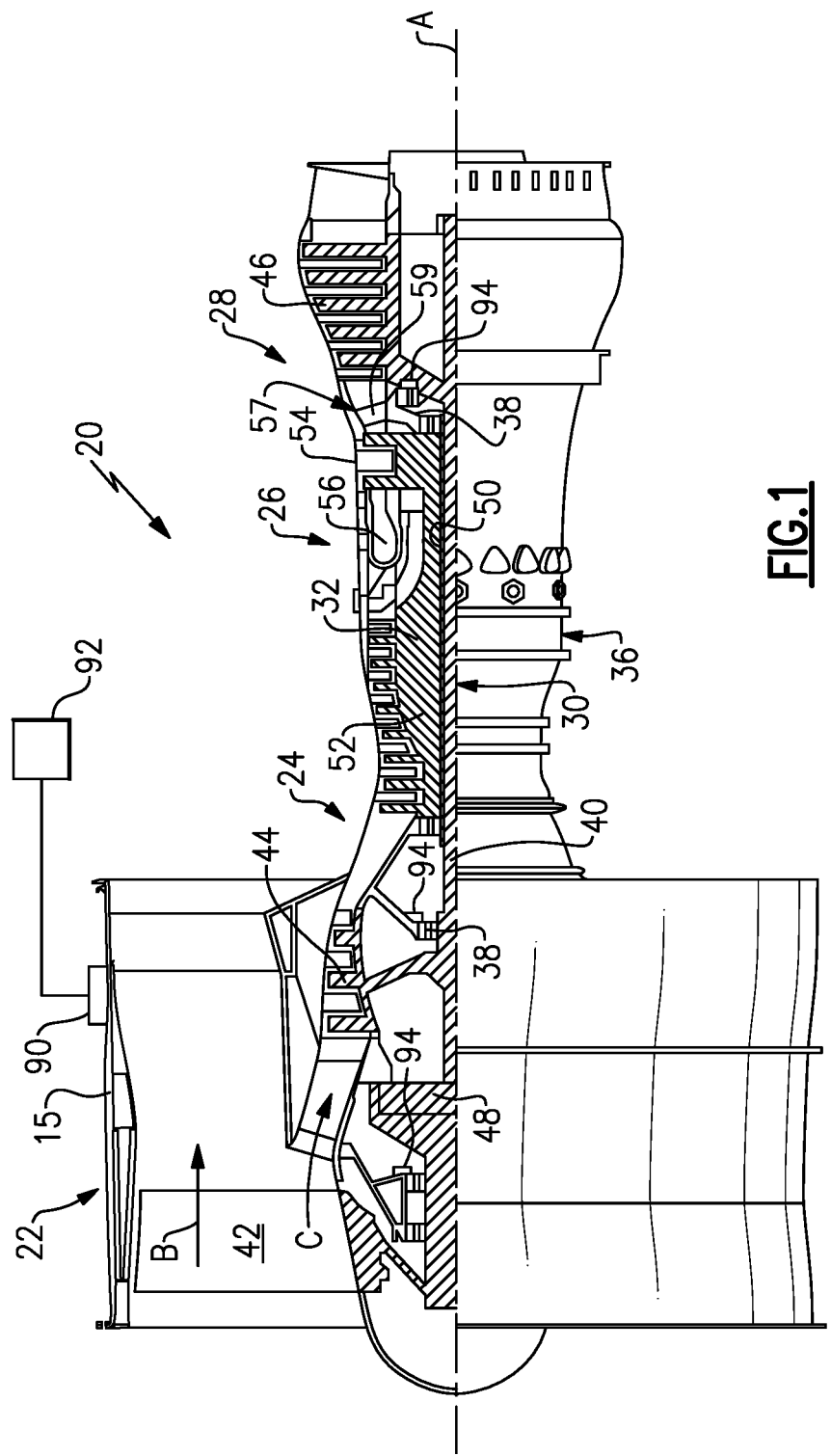
FIG. 1 illustrates a schematic view of an exemplary engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{-0.5}$. The "Low corrected fan tip speed" as disclosed herein according to one non-limiting embodiment is less than about 1150 ft/second (350.5 meters/second).

The exemplary gas turbine engine 20 includes a vibrational sensor 90 positioned in or on the exterior casing of the engine 20. The vibrational sensor 90 is configured to detect an overall magnitude of vibrations within the engine 20 at any given time. Due to its position, the isolation ability of the vibration sensor 90 is limited to distinct shafts and has limited capability to distinguish between related components. The vibrational sensor 90 is connected to a controller 92, such as a full authority digital engine controller (FADEC). In alternative examples, the controller 92 can be a general aircraft controller, a dedicated sensor controller, or any other type of controller configured to receive and interpret signals from the vibrational sensor 90, and from one or more micro-electromechanical-systems (MEMS).

Positioned local to each bearing system 38 is a micro-electro-mechanical-system (MEMS) 94. As used herein a component, such as the MEMS 94, is "local to" a system when the component is either positioned on or in the component to which it is local, or is in a position where vibrational forces on the component are dominated by the vibrational forces on the system to which the component is local. Each of the MEMS 94 is connected to the controller 92 either via a wireless connection, or a direct wired connection depending on the particular characteristics of the specific engine 20. While illustrated as positioned local to each of the bearing systems 38 of the engine 20, it is appreciated that the MEMS 94 can be positioned local to any number of different components including, but not limited to, an accessory gearbox, a fuel pump, an oil pump, airframe components, or any other line replaceable component.

As used herein MEMS 94 refer to microscopic, or similarly small, electromechanical devices configured to detect the occurrence of an event and transmit a signal when the occurrence is detected. In some examples, the MEMS 94 are made up of components ranging from 1 to 100 micrometers in size and the MEMS 94 will typically have an length in its longest dimension ranging from 20 micrometers to 1 millimeter. In some examples the MEMS 94 include a processor and micro sensors configured to sense and interpret the immediately surrounding environment.

Each of the MEMS 94 is configured to trigger when vibrational forces on the MEMS 94 exceed a predetermined threshold. When triggered, the MEMS 94 provides a signal to the controller 92. The controller 92, in turn, increases a data acquisition rate of the vibrational sensor 90, such that the increased data acquisition rate compensates for a structural response mode of the particular system that the MEMS 94 is local to. The data acquisition rate remains adjusted for a predetermined duration. In some examples the predetermined duration is at least the length of an expected vibrational event. In further examples, the predetermined duration can be within the range of 100-400 ms. Once the predetermined duration has elapsed, the data acquisition rate is decreased to the original rate, and normal data collection from the sensor 90 is resumed.

While FIG. 1 illustrates a single system sensor 90, it is appreciated that multiple system sensors 90 can be connected and operate in the same manner. In such an example, each of the MEMS 94 each correspond to one or more system sensor 90.

Figure 2:
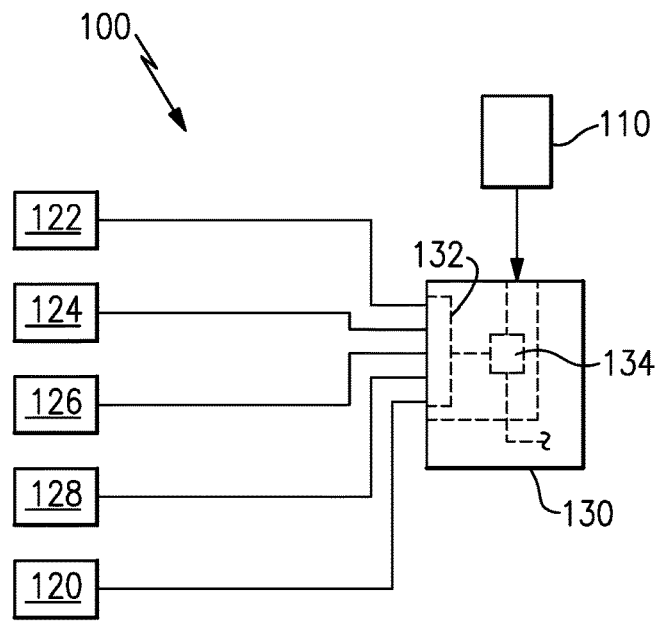
FIG. 2 schematically illustrates a notional system configuration for a data acquisition management system.

With continued reference to FIG. 1, FIG. 2 schematically illustrates an exemplary sensor system 100 including an aircraft system sensor 110, and multiple MEMS 120, 122, 124, 126, 128. Each of the MEMS 120, 122, 124, 126, 128 is positioned within an aircraft system, such as a gas turbine engine, and is disposed local to a corresponding component within the aircraft system. Each of the MEMS 120, 122, 124, 126, 128 and the system sensor 110 are connected to a controller 130. The controller 130 includes a MEMS module 132 configured to receive and interpret signals from each of the MEMS 120, 122, 124, 126, 128. The MEMS module 132 can be a software module, stored in a memory of the controller 130, or a hardware portion of the controller 130, depending on the needs and environment of the specific aircraft system, and the controller 130.

Also included within the controller 130 is a data acquisition module 134. The data acquisition module 134 acquires sensor data from the aircraft system sensor 110 and provides the acquired data to a remainder of the controller 130 systems. The data acquisition module 134 controls a data acquisition rate of the data from the aircraft system sensor 110, and operates at a default base data acquisition rate.

Stored within the MEMS module 132, or the data acquisition module 134, is a set of data acquisition rates, with at least one data acquisition rate corresponding to each MEMS 120, 122, 124, 126, 128. Each of the data acquisition rates compensates for the structural response modes of the components to which the corresponding MEMS 120, 122, 124, 126, 128 is local, and allows for a sufficient data acquisition rate from the aircraft system sensor 110 when the corresponding MEMS 120, 122, 124, 126, 128 is triggered. In some examples, multiple MEMS 120, 122, 124, 126, 128 can correspond to the same data acquisition rate.

In some cases, multiple MEMS 120, 122, 124, 126, 128 can be triggered simultaneously, either due to a single event triggering multiple MEMS 120, 122, 124, 126, 128, or due to independent events occurring simultaneously. When multiple MEMS 120, 122, 124, 126, 128 trigger at the same time, the controller 130 causes the data acquisition module 134 to adjust the data acquisition rate to be the highest data acquisition rate corresponding to one of the triggered MEMS 120, 122, 124, 126, 128 while keeping track of all triggered MEMS 120, 122, 124, 126, 128. By adjusting to the highest data acquisition rate, the controller 130 ensures that the data is acquired at a sufficient rate to compensate for the structural vibratory mode of each of the components to which the triggered MEMS 120, 122, 124, 126, 128 is local.

Figure 3:
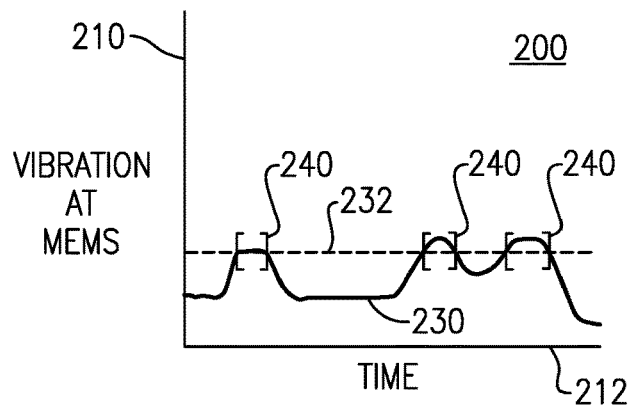
FIG. 3 schematically illustrates a data acquisition rate chart during an exemplary aircraft operation.
Figure 4:
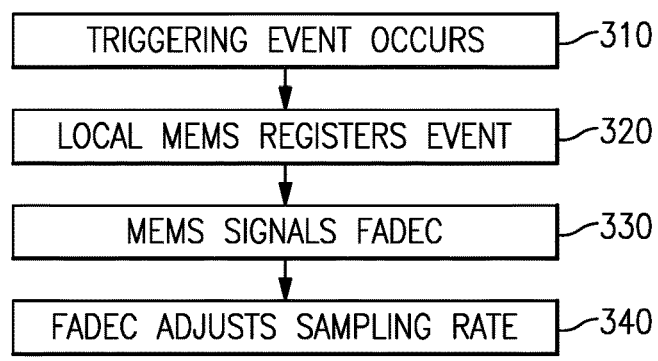
FIG. 4 illustrates an exemplary method of operating a data acquisition management system.
Figure 5:
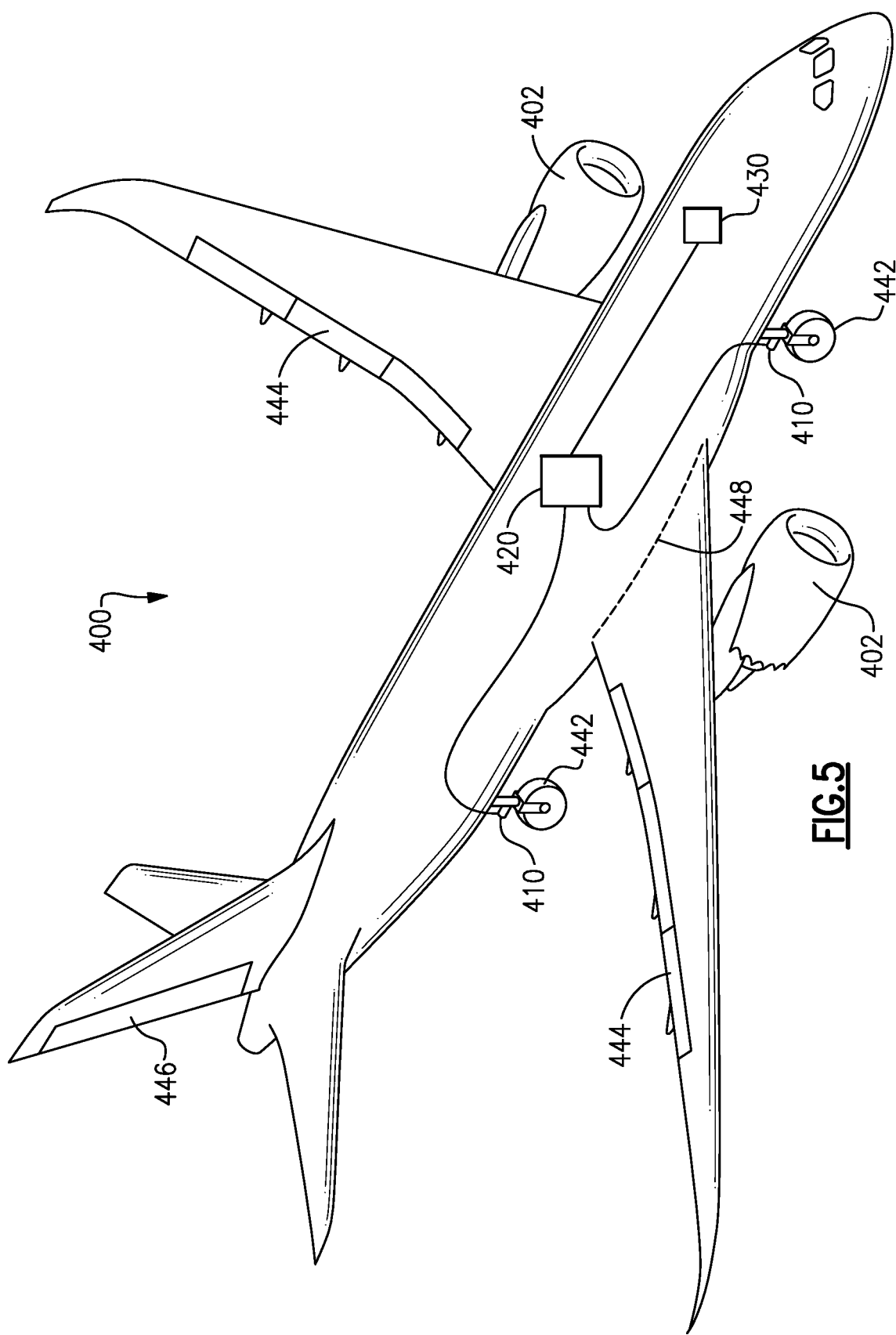
FIG. 5 schematically illustrates an aircraft including a data acquisition management system expanded beyond an aircraft engine.

With continued reference to FIGS. 1 and 2, FIG. 3 illustrates a chart 200 of vibrations at an exemplary MEMS 120, 122, 124, 126, 128. The chart 200 includes axis 210, 212 corresponding to vibration of a component to which the exemplary MEMS is local (axis 210) and corresponding to time (axis 212). The vibration of the component with respect to time is illustrated via a line 230. Each time the vibrations exceed a threshold 232, the MEMS is triggered and a signal is sent to the controller from the MEMS. The signal causes the controller to increase the data acquisition rate for a system sensor to the data acquisition rate corresponding to the triggered MEMS for a predefined time window 240. In some examples, the predefined time window 240 for every MEMS in a given system can be identical. In alternative examples, the predefined time window can be unique to each MEMS, and can be selected based on an expected event type at the component corresponding to the MEMS. In yet further examples, the MEMS can continuously trigger while the threshold is exceeded, and the data acquisition rate is increased for a duration equal to the predefined window plus the length that the threshold is exceeded.

With continued reference to FIGS. 1-3, FIG. 4 illustrates a method for operating the system 100 of FIG. 2. During operation of the aircraft, an initial triggering event occurs local to an engine component at a "Triggering Event Occurs" step 310. In response to the occurrence of the triggering event, a MEMS local to the engine component registers the event in a "Local MEMS Registers Event" step 320. The local MEMS responds to the event by transmitting a signal to a controller, such as a FADEC, in a "MEMS Signals FADEC" step 330. The signal is, in some examples, a simple indication that the MEMS originating the signal registered an event. In other examples, additional data such as a magnitude of the event can be transmitted as well. When the controller receives the signal, the controller adjusts a data acquisition rate (sampling rate) of a corresponding system sensor that senses a parameter of the engine system in a "FADEC Adjusts Sampling Rate" step 340.

With continued reference to FIGS. 1-4, FIG. 5 illustrates an exemplary aircraft 400 including MEMS 410 disposed at additional sensitive systems outside of the gas turbine engines 402. Each of the MEMS 410 is connected to a corresponding controller 420, and the corresponding controller 420 is configured to increase a sampling rate of a corresponding sensor 430 using a similar process to the process described above with regards to the gas turbine engine. In this way, the system and process of FIGS. 1-4 can be expanded to additional systems and structures within the aircraft 400. By way of example, the additional structures can include landing gears 442, wing ailerons 444, tail systems 446, wing joints 448, and the like. Further, while described above with specific relationship to vibrational triggers and a vibrational system sensor, one of skill in the art will appreciate that the system described herein can be utilized in conjunction with any other engine or system parameter sensor and is not limited to vibrational sensors.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An aircraft sensor system comprising:
a first sensor configured to detect a parameter of an aircraft system;
a first micro electro-mechanical-system (MEMS) disposed local to a first component within the aircraft system, the first MEMS being communicatively connected to a controller, being configured to trigger in response to a first corresponding parameter exceeding a first threshold, and wherein the controller includes a non-transitory memory storing a first data acquisition rate corresponding to first MEMS;
a second MEMS disposed local to a second component within the aircraft system, the second MEMS being communicatively connected to the controller and being configured to trigger in response to a second corresponding parameter exceeding a second threshold, and wherein the non-transitory memory stores a second data acquisition rate corresponding to the second MEMS; and
the controller being connected to an output of the first sensor and the non-transitory memory storing instructions configured to cause the controller to increase a sampling rate of the first sensor to a sampling rate corresponding to one of the first data acquisition rate and the second data acquisition rate for at least a predetermined length of time in response to the first MEMS being triggered and the second MEMS being triggered, wherein the sampling rate of the first sensor is increased to a higher of the first data acquisition rate and the second data acquisition rate.

2. The aircraft sensor system of claim 1, wherein the first sensor is a vibration sensor.

3. The aircraft sensor system of claim 1, wherein the first sensor is disposed on a gas turbine engine housing and is configured to sense a parameter of a gas turbine engine.

4. The aircraft sensor system of claim 1, further comprising a plurality of MEMS including the first MEMS, the second MEMS and at least a third MEMS, with each MEMS in the plurality of MEMS being local to a distinct component from each other MEMS in the plurality of MEMS.

5. The aircraft sensor system of claim 4, wherein each MEMS in the plurality of MEMS is connected to the controller and is configured to trigger in response to a corresponding parameter of the component to which the MEMS is local to exceeding a threshold.

6. The aircraft sensor system of claim 1, wherein the first data acquisition rate corresponding to the first local component is distinct from the second data acquisition rate corresponding to the second local component.

7. The aircraft sensor system of claim 4, wherein each MEMS in the plurality of MEMS has a length in its longest dimension ranging from 20 micrometers to 1 millimeter.

8. An aircraft sensor system comprising:
a first sensor configured to detect a parameter of an aircraft system;
a first micro electro-mechanical-system (MEMS) disposed local to a first component within the aircraft system, the first MEMS being communicatively connected to a controller, and being configured to trigger in response to a corresponding parameter exceeding a threshold; and
the controller being connected to an output of the first sensor and including a non-transitory memory storing instructions configured to cause the controller to increase a sampling rate of the first sensor to a sampling rate corresponding to the first component for a predefined length of time in the range of 100-400 ms.

9. A method for operating an aircraft sensor system comprising:
a controller receiving a first signal from a first micro electro-mechanical-system (MEMS) disposed local to a first component, wherein the first signal indicates that a first event has occurred; and
the controller increasing a sampling rate of a system sensor from a first sampling rate to a second sampling rate for a predefined time period in response to receiving the signal, the predefined time period being in the range of 100-400 ms.

10. The method of claim 9 wherein the controller includes a non-transitory memory storing instructions configured to cause the controller to perform the method.

11. A method for operating an aircraft sensor system comprising:
a controller receiving a first signal from a first micro electro-mechanical-system (MEMS) disposed local to a first component, wherein the first signal indicates that a first event has occurred;
the controller increasing a sampling rate of a system sensor from a first sampling rate to a second sampling rate for at least predefined time period in response to receiving the signal;
the controller receiving a second signal from a second micro electro-mechanical-system (MEMS) disposed local to a second component simultaneous with the first signal, wherein the second signal indicates that a second event has occurred; and
the controller increasing the sampling rate of the system sensor from the first sampling rate to a higher of the second sampling rate and a third sampling rate, each of the second sampling rate and the third sampling rate corresponding to one of the first and second component.

12. The method of claim 11, wherein the second sampling rate is at least sufficient to compensate for a structural vibratory mode of the first component.

13. The method of claim 11, wherein the predefined time period begins upon receipt of the first signal.

14. The method of claim 11, wherein the first event is a vibration at the first component exceeding a predetermined threshold.

15. A method for operating an aircraft sensor system comprising:
   a controller receiving a first signal from a first micro electro-mechanical-system (MEMS) disposed local to a first component, wherein the first signal indicates that a first event has occurred; and
   the controller increasing a sampling rate of a system sensor from a first sampling rate to a second sampling rate for at least a predefined time period in response to receiving the signal, wherein the predefined time period begins when the first signal ceases being received.

* * * * *